(12) United States Patent
Sutehall et al.

(10) Patent No.: US 11,391,903 B2
(45) Date of Patent: Jul. 19, 2022

(54) BLOCKING AN OPTICAL FIBER IN A FIBER OPTIC CABLE

(71) Applicant: Prysmian S.p.A., Milan (IT)

(72) Inventors: Ralph Sutehall, Milan (IT); Patrick Briggs, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 17/193,800

(22) Filed: Mar. 5, 2021

(65) Prior Publication Data

US 2021/0286145 A1    Sep. 16, 2021

(30) Foreign Application Priority Data

Mar. 10, 2020  (IT) .................. 102020000005038

(51) Int. Cl.
*G02B 6/44*    (2006.01)
*G02B 6/25*    (2006.01)
(Continued)

(52) U.S. Cl.
CPC ............ *G02B 6/4471* (2013.01); *G02B 6/25* (2013.01); *G02B 6/4251* (2013.01); *G02B 6/46* (2013.01); *G02B 6/4473* (2013.01); *G02B 6/4483* (2013.01); *G02B 6/4495* (2013.01); *G02B 6/48* (2013.01)

(58) Field of Classification Search
None
See application file for complete search history.

(56) References Cited

U.S. PATENT DOCUMENTS 5,199,095 A * 3/1993 Iapicco ................ G02B 6/3865
                                                    385/100
7,280,725 B2 * 10/2007 Brown ................. G02B 6/4472
                                                    385/100
(Continued)

FOREIGN PATENT DOCUMENTS

CN    201152902 Y  * 11/2008
CN    209132482 U  *  7/2019
(Continued)

OTHER PUBLICATIONS

Panduit FS083 ("Cable Preparation Best Practices for Fiber Optic Indoor/Outdoor Stranded Loose Tube Cable", Best Practices, Panduit Corp. 2014, pp. 1-14) (Year: 2014).*
(Continued)

*Primary Examiner* — Michelle R Connelly
(74) *Attorney, Agent, or Firm* — Slater Matsil, LLP (57) ABSTRACT

It is disclosed a method for coupling an optical fiber to a fiber optic cable, the fiber optic cable comprising a sheath surrounding an optical core comprising a buffer tube, the optical fiber being loosely contained in the buffer tube. The method comprises: cutting the sheath for a predetermined length thereof and exposing a corresponding portion of the optical core extending outward beyond a butt of the cut sheath; cutting the buffer tube of the exposed optical core and exposing a portion of the optical fiber; using a blocking tube to at least partially surround a section of the exposed portion of the optical fiber; and injecting a sealant into the blocking tube to lock the optical fiber within the blocking tube and couple the optical fiber to the fiber optic cable.

20 Claims, 7 Drawing Sheets

(51) Int. Cl.
*G02B 6/46* (2006.01)
*G02B 6/42* (2006.01)
*G02B 6/48* (2006.01)

(56) References Cited

U.S. PATENT DOCUMENTS

| | | | |
|---|---|---|---|
| 7,703,990 B1 | 4/2010 | de Jong et al. | |
| 2005/0111800 A1 | 5/2005 | Cooke et al. | |
| 2006/0120672 A1 | 6/2006 | Cody et al. | |
| 2012/0134635 A1* | 5/2012 | Davies | G02B 6/4495 385/113 |
| 2015/0093084 A1* | 4/2015 | Cooke | G02B 6/4471 385/113 |

FOREIGN PATENT DOCUMENTS

| | | | | |
|---|---|---|---|---|
| EP | 0779527 A2 * | 6/1997 | | G02B 6/4452 |
| EP | 1557707 A1 | 7/2005 | | |
| JP | 3461724 B2 * | 10/2003 | | |
| WO | 2007113522 A1 | 10/2007 | | |

OTHER PUBLICATIONS

Corning ("Understanding Fiber Optics & Local Area Networks", Corning Optical Communications, Just the Technical Facts, LAN-737-AEN, Mar. 2019, pp. 1-12) (Year: 2019).*
Panduit FS077 ("Cable Access Procedures for Opti-Core Fiber Optic Outside Plant Reverse Oscillating Lay (ROL) Cable", Best Practices, Panduit Corp. 2014, pp. 1-14) (Year: 2014).*
OFS (Installation Practice IP-011A, OFS Fitel, May 2013, pp. 1-20) (Year: 2013).*
Corning (MiniXtendTM HD Loose Tube Cable Jacket and Buffer Tube Removal Procedures, Standard Recommended Procedure 004-221-AEN, Issue 2, Jun. 2015, pp. 1-8) (Year: 2015).*
Fiber Optic Network Products ("Loose-tube Cable vs. Tight-buffered Cable", https://www.fiberopticshare.com/loose-tube-cable-vs-tight-buffered-cable.html, 2015) (Year: 2015).*

* cited by examiner

Fig. 10

BLOCKING AN OPTICAL FIBER IN A FIBER OPTIC CABLE

CROSS-REFERENCE TO RELATED APPLICATIONS

This application claims the benefit of Italian Patent Application No. 1020000005038 filed on Mar. 10, 2020, which application is hereby incorporated herein by reference.

TECHNICAL FIELD

The present invention relates to the field of fiber optic cables.

BACKGROUND

In an optical access network, such as an FTTx, e.g. FTTH or FTTP, network, the so-called "central loose tube cables" (briefly, CLT cables) and "multi loose tube cable" (briefly, MLT cables) are often used as in these networks the optical fibers must be individually extracted from the cable and spliced. In a CLT cable, all the optical fibers of the cable are loosely arranged within a single buffer tube, which is in turn surrounded by a sheath. In a MLT cable, the optical fibers of the cable are loosely arranged within a plurality of buffer tubes, which are all contained within a sheath.

An optical access network may comprise aerial cable installations of fiber optic cables. As known, aerial cables are subject to high tension loads due to a number of factors including the cable weight and the environmental conditions (ice, wind, etc.). As a result of wind and/or ice, in particular, the fiber optic cable is subject to dynamic loading conditions. These conditions cause the cable length to increase due to the increase in cable sag when the loading is applied, while the cable is reverted back to its original configuration when the loading ceases.

In aerial cable installations, typically, the optical fibers are terminated at each end of a span inside a joint closure. When the cable length increases due to ice and/or wind, the excess of the optical fiber(s) located within the joint closure is pulled into the span. However, when the loading ceases, the optical fiber(s) are unable to revert back to their original configuration due to the resistance of the gel within the loose tube. This situation would cause an increment in the optical fiber losses within the span due to micro-bending of the optical fiber(s).

To prevent the pulling of the optical fiber(s) into the span, a cable anchoring device can be used to secure the optical fibers against movement. For instance, the cable anchoring device may comprise a couple of bollards around which the cable may be wound to block the optical fiber(s). The device may be positioned close to the joint closure at each end of the span, which means that it may be positioned on a pole, in an underground chamber, in a street-side cabinet or on the wall of a house, at the customer premises.

WO 2007/113522 A1 discloses a method of protecting a weak point along a cable, the cable being subject to stress, comprising the steps of (i) selecting a section of the cable between a source of the strain and up to and including the weak point, (ii) using the section of the cable to form a cable configuration comprising a pair of coils, by—putting a twist in the cable by winding the cable in a first direction to form a first coil, and—taking the twist out of the cable by winding the cable in a second direction to form a second coil, and (iii) securing under tension the cable configuration formed.

EP 1557707 B1 discloses a method of installing an optical cable, which includes the steps of exposing a portion of the buffer tube over a predetermined length and forming the exposed portion of the buffer tube into a coupling coil.

SUMMARY

In one embodiment, a method for securing an optical fiber of a fiber optic cable includes cutting for a predetermined length through a sheath of the fiber optic cable to expose a portion of an optical core extending outward beyond a butt of a remaining uncut sheath. The fiber optic cable comprises the sheath surrounding the optical core that comprises a buffer tube, the optical fiber being loosely contained in the buffer tube. The method further comprises cutting a portion of the buffer tube contained in the exposed portion of the optical core and exposing a portion of the optical fiber; using a blocking tube to at least partially surround a section of the exposed portion of the optical fiber; and injecting a sealant into the blocking tube to lock the optical fiber within the blocking tube and couple the exposed portion of the optical fiber to the fiber optic cable.

In one embodiment, a method for installing a fiber optic cable includes cutting for a predetermined length through a sheath of the fiber optic cable to expose a portion of an optical core extending outward beyond a butt of a remaining uncut sheath. The fiber optic cable comprises the sheath surrounding the optical core that comprises a buffer tube, an optical fiber being loosely contained in the buffer tube. The method further includes cutting a portion of the buffer tube contained in the exposed portion of the optical core and exposing a portion of the optical fiber; sliding a blocking tube to at least partially surround a section of the exposed portion of the optical fiber; and injecting a sealant into the blocking tube to lock the optical fiber within the blocking tube and secure the exposed portion of the optical fiber to the fiber optic cable.

In one embodiment, a fiber optic cable comprises an optical core comprising a buffer tube and an optical fiber loosely contained in the buffer tube; a sheath surrounding the optical core; an exposed portion of the optical fiber; a blocking tube at least partially surrounding a section of the exposed portion of the optical fiber; and a sealant disposed in the blocking tube and holding the optical fiber securely within the blocking tube to secure the exposed portion of the optical fiber to the fiber optic cable.

BRIEF DESCRIPTION OF THE DRAWINGS

Further characteristics and advantages will become more apparent by reading the following detailed description of an embodiment given as an example with reference to the accompanying drawings, wherein:

FIGS. 4-10 illustrate the steps of the method according to the present invention, wherein

DETAILED DESCRIPTION OF ILLUSTRATIVE EMBODIMENTS

In the present description and claims, unless otherwise specified, all the numbers and values should be intended as preceded by the term "about." Also, all ranges include any combination of the maximum and minimum points disclosed and include any intermediate ranges therein, which may or may not be specifically enumerated herein.

In particular, the present invention, in various embodiments, relates to a method for coupling an optical fiber to a fiber optic cable for terrestrial networks, in particular—but not exclusively—optical access networks such as FTTx (Fiber To The x) networks, e.g. FTTH (Fiber To The Home) networks and FTTP (Fiber To The Premises) networks.

The inventors noticed that using a cable anchoring device comprising the bollards as described above (such as the device shown in FIGS. 7A, 7B and 8 of WO 2007/113522 A1) is not feasible when the aerial cable installation comprises more than one central loose tube cable branching off from the joint closure. In that case, indeed, using a number of such devices to anchor each cable with a respective pair of bollards would result in an excessively cumbersome arrangement.

In view of the above, the Applicant, in various embodiments, has tackled the issues relating to providing a method for coupling an optical fiber to a fiber optic cable for terrestrial networks, in particular, but not exclusively, FTTx, e.g. FTTH or FTTP, networks, comprising aerial cable installations, which allows avoiding the fiber(s) to be pulled into the span in the presence of a load on the fiber optic cable while avoiding any cumbersome arrangement of cable anchoring devices. It is further to be noticed that avoiding to use the cable anchoring devices described above would also result in a cheaper installation.

In the following description and in the claims, the expression "exposed portion of the buffer tube" or "exposed buffer tube" of a fiber optic cable, in particular a CLT cable as briefly described above, will refer to a portion of the buffer tube around which the sheath has been removed. Similarly, the expression "exposed portion of the optical fiber" or "exposed optical fiber" will refer to a portion of the optical fiber around which the buffer tube has been removed.

In one aspect, the present invention relates to a method for coupling an optical fiber to a fiber optic cable, the fiber optic cable comprising a sheath surrounding an optical core comprising a buffer tube, the optical fiber being loosely contained in the buffer tube, the method comprising: a) cutting the sheath for a predetermined length thereof and exposing a corresponding portion of the optical core extending outward beyond a butt of the cut sheath; b) cutting the buffer tube of the exposed optical core and exposing a portion of the optical fiber; c) using a blocking tube to at least partially surround a section of the exposed portion of the optical fiber; and d) injecting a sealant into the blocking tube to lock the optical fiber within the blocking tube and couple the optical fiber to the fiber optic cable.

In some embodiments, step b) comprises cutting the buffer tube of the exposed optical core at a predetermined distance from the butt of the sheath leaving an exposed portion of the buffer tube extending outward beyond the butt of the sheath and exposing a portion of the optical fiber, and step c) further comprises using a blocking tube to at least partially surround a section of the exposed portion of the optical fiber and a section of the exposed portion of the buffer tube.

In an embodiment, the method further comprises abrading a surface of the exposed portion of the buffer tube.

In some embodiments, step c) comprises sliding the blocking tube over the exposed portion of the optical fiber and over the exposed portion of the buffer tube until an end of the blocking tube leans against the butt of the sheath.

In some embodiments, the method further comprises cleaning the exposed portion of the optical fiber.

According to embodiments of the present invention, the blocking tube may have a length ranging between 40 mm and 50 mm.

According to embodiments of the present invention, the blocking tube is a hollow cylinder having a cross section with an outer diameter of 4 mm and an inner diameter comprised between 2.5 mm and 3 mm.

In some embodiments, the blocking tube may be made of polyvinyl chloride or polyethylene.

In some embodiments, the sealant is a two component polyurea compound or a two component polyurethane compound.

In another aspect, the present invention relates to a method for installing a fiber optic cable, the method comprising a method for coupling an optical fiber to the fiber optic cable as set forth above.

In a further aspect, the present invention relates to a fiber optic cable comprising an optical core comprising a buffer tube and an optical fiber loosely contained therein, the fiber optic cable comprising a sheath surrounding the optical core, the fiber optic cable further comprising an exposed portion of the optical fiber, wherein the fiber optic cable further comprises: a blocking tube at least partially surrounding a section of the exposed portion of the optical fiber; and a sealant injected in the blocking tube to lock the optical fiber within the blocking tube and couple the optical fiber to the fiber optic cable.

According to some embodiments, the fiber optic cable comprises an exposed portion of the buffer tube extending outward beyond a butt of the sheath, wherein the exposed portion of the optical fiber extends outward beyond the end of the exposed portion of the buffer tube, and wherein the blocking tube at least partially surrounds the section of the exposed portion of the optical fiber and a section of the exposed portion of the buffer tube.

In some embodiments, an end of the blocking tube leans against the butt of the sheath.

Figure 1:
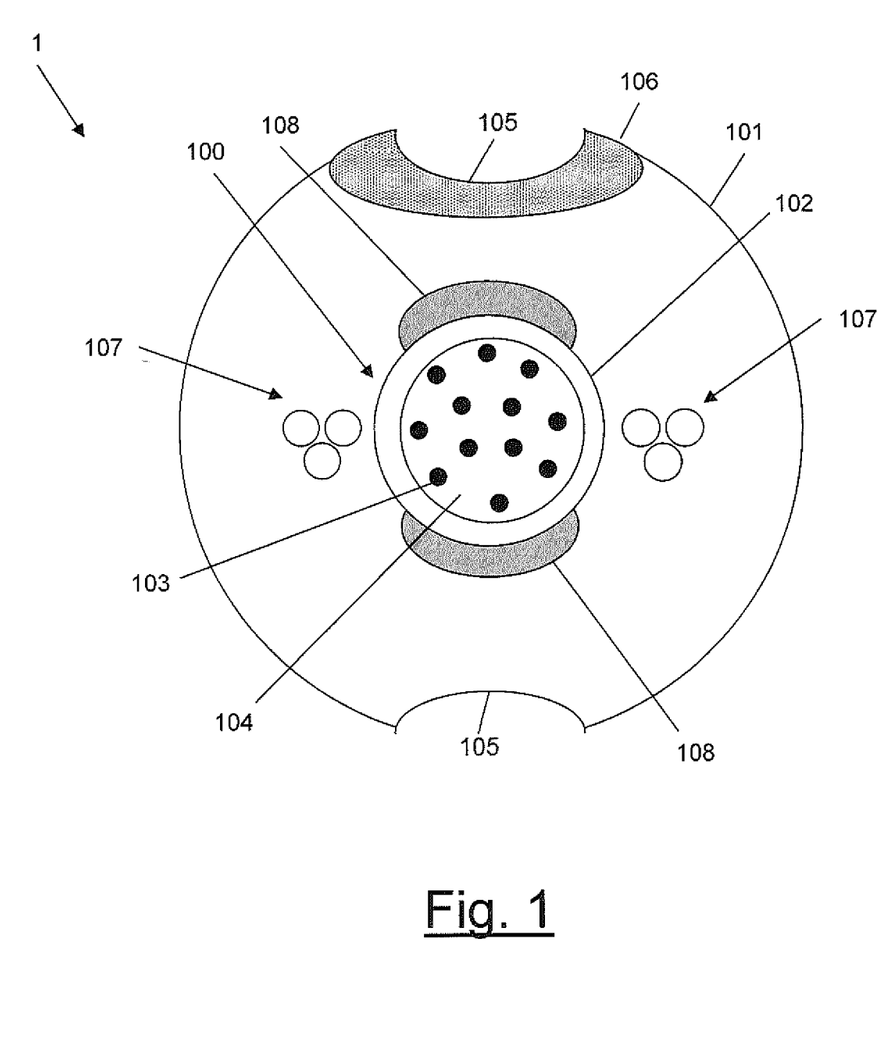
FIG. 1 schematically shows a cross section of a central loose tube cable.

FIG. 1 shows an optical cable 1 according to an embodiment of the present invention.

Figure 2:
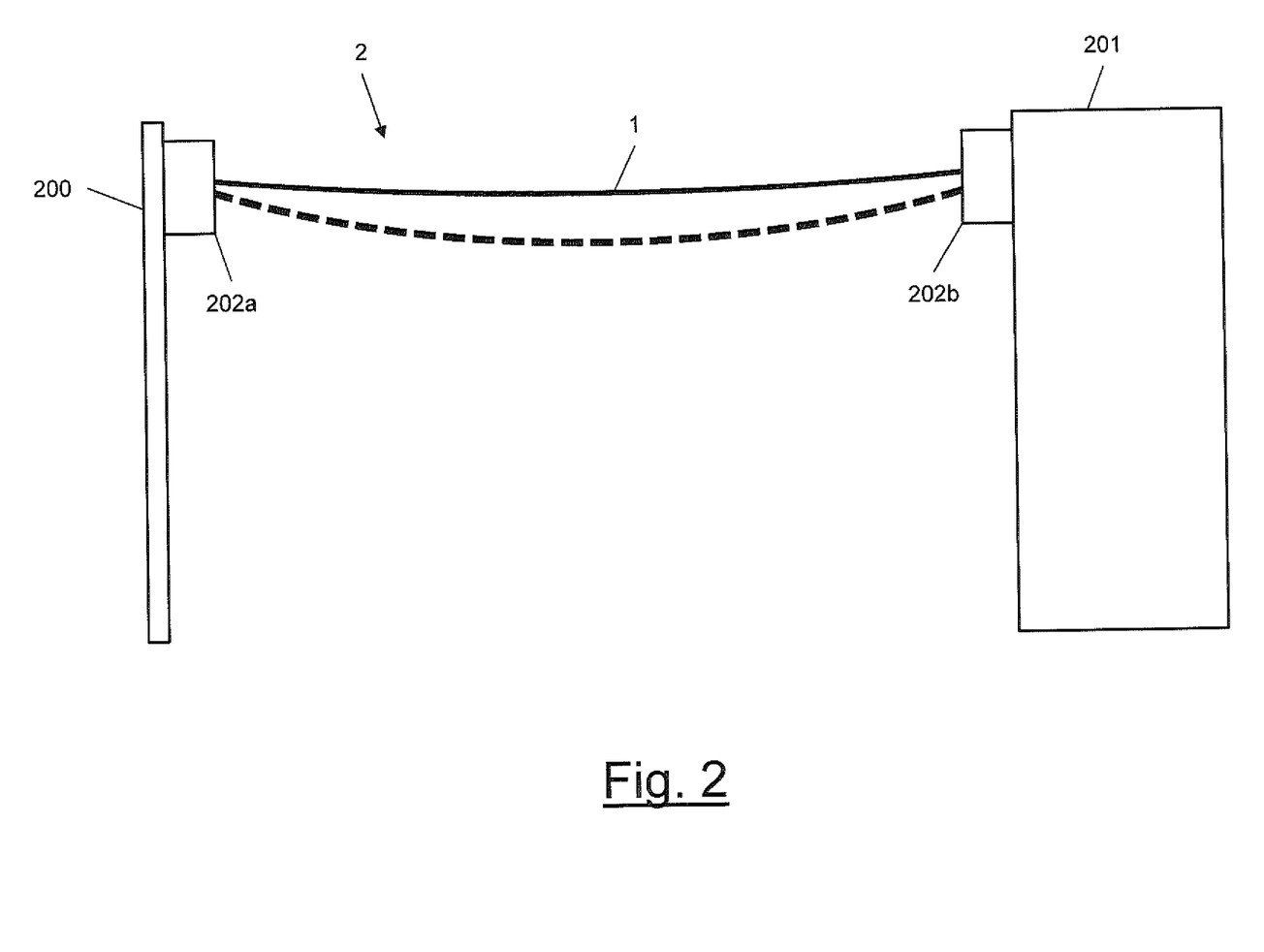
FIG. 2 schematically shows an aerial cable installation.

The optical cable 1 according to this embodiment of the present invention is a drop cable for FFTx (e.g. FTTH or FTTP) applications. FIG. 2 schematically shows an exemplary arrangement of the cable 1 to form a span 2 of the optical access network. The span of FIG. 2 extends from a pole 200 to a house 201. At each ends of the span 2, a respective joint box or closure 202a, 202b is provided as mounted on the pole 200 and on the wall of the house 201.

The continuous line illustrates the situation according to which the cable 1 is under normal loading conditions (due to, e.g., its weight), while the dashed line illustrates the situation in which the cable 1 is under wind and/or ice loading conditions causing the length of the span to increase.

The optical cable 1 comprises an optical core 100 and a sheath 101 surrounding the optical core 100. The optical core 100 comprises a buffer tube 102 and a number of optical fibers 103 loosely arranged within the buffer tube 102. The buffer tube 102 may have an outer diameter lower than 4 mm, and in some embodiments lower than 2.5 mm. The buffer tube 102 can be made, for example, of a thermoplastic polymeric material, for instance PBT (polybutylene terephthalate). The number of optical fibers 103 can range, for example, from 1 to 12. By way of non limiting example, the cable shown in FIG. 1 comprises twelve optical fibers 103. For instance, the optical fibers 103 can be single-mode or multi-mode fibers. In particular, the optical fibers 103 may be, for instance, single 250 μm fibers or up jacketed 900 μm fibers.

The interstices between the optical fibers 103 within the buffer tube 102 may be filled with a water-blocking material 104, e.g. a thixotropic gel.

The sheath 101 is made, for example, of PE (polyethylene). The sheath 101 has a substantially uniform thickness along its perimeter. In particular, the sheath 101 may have a substantially uniform outer diameter along its perimeter. The outer diameter of the sheath 101 is e.g. lower than 10 mm, in some embodiments lower than 8 mm, in further embodiments between 8 mm and 5 mm.

According to the embodiment shown in FIG. 1, the sheath 101 comprises two grooves (or notches) 105 placed at substantially diametrically opposed positions. The grooves 105 have, for example, a blunt profile. Furthermore, the groove depth can be, for example, substantially equal to 0.6 mm. This way, even when the cable 1 is bent or twisted e.g. during installation, the presence of the grooves 105 does not impair the sheath integrity. As shown in FIG. 1, at least one of the grooves 105 is optionally provided with an identification stripe 106 and/or ink-jet printed identification codes allowing identification of the cable 1.

The cable 1 may further comprise two strength members 107 arranged within the thickness of the sheath 101. In the particular embodiment of FIG. 1, the two strength members 107 are arranged at diametrically opposed positions, embedded within the thickness of the sheath 101. For instance, each strength member 107 comprises a number of (three, in the embodiment of FIG. 1) metallic strands, e.g. coated steel strands. The strength members 107 may be arranged on a longitudinal plane perpendicular to the longitudinal plane containing the bisector of the grooves 105.

The cable 1 also comprises two optional ripcords 108 arranged between the optical core 100 and the sheath 101. The ripcords 108 may be aligned with the grooves 105. Each ripcord 108 is made, for example, of non-metallic yarns, e.g. aramid yarns or polyester yarns.

Figure 3:
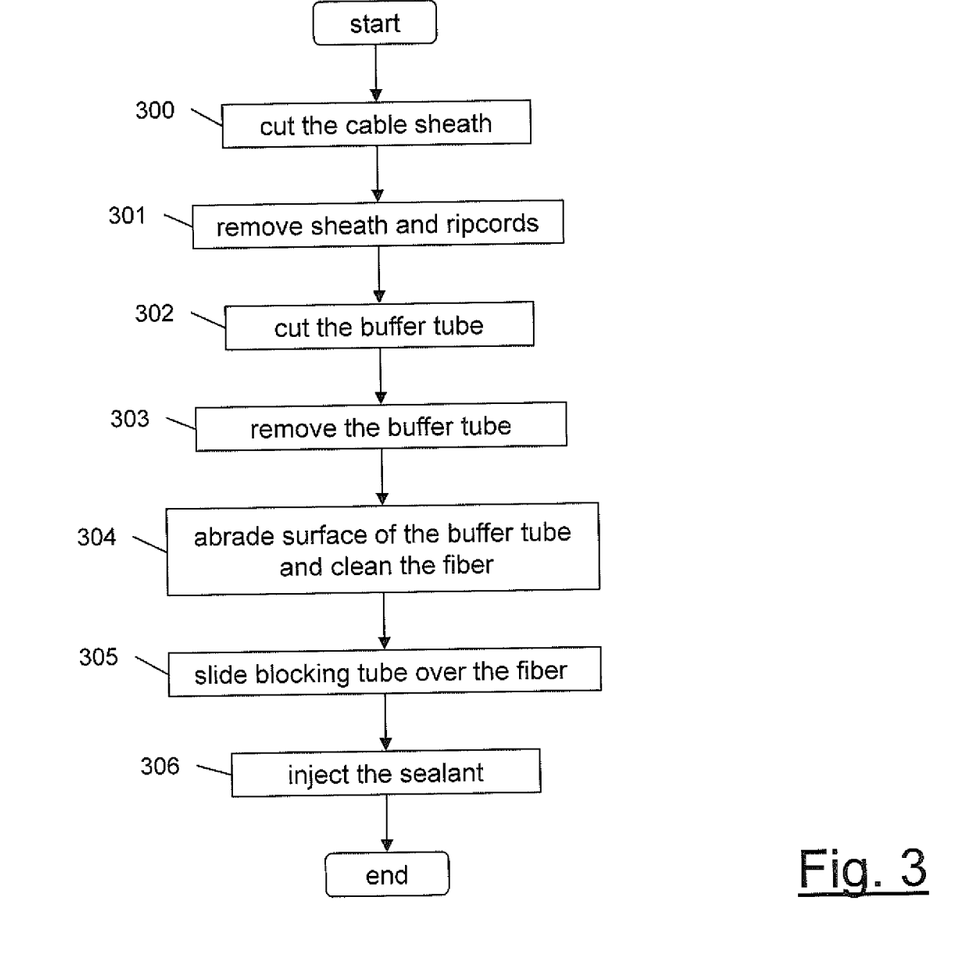
FIG. 3 is a flowchart of the steps of the method for coupling an optical fiber to a fiber optic cable according to the present invention.

According to the present invention, the method for coupling the optical fibers to the central loose tube cable of FIG. 1 comprises the steps illustrated in the flow chart of FIG. 3 in combination with FIGS. 4-10.

Firstly, a tube of a predetermined length is provided. In the following description and in the claims, this tube will be referred to as "blocking tube" and indicated with reference number 109 in the Figures. The blocking tube may be, for instance, a PVC (polyvinyl chloride) tube. The material of the blocking tube can be, alternatively, PE (polyethylene). According to the embodiments of the present invention illustrated in the Figures, the blocking tube is a hollow cylinder. In this case, the cross section of the blocking tube may have an outer diameter substantially equal to 4 mm and an inner diameter comprised between 2.5 mm and 3.0 mm. According to other embodiments, the cross section of the blocking tube may have another shape (e.g. oval or rectangular). According to even further embodiments, the blocking tube may have a not continuous sidewall, e.g. it may comprise a longitudinal opening in the sidewall.

Moreover, a sealant is provided. The sealant may be made of a resin and a hardener. For instance, the sealant may be a two component polyurea compound or a two component polyurethane compound, such as, for instance, the Closure Sealant 10B product manufactured by ALH Systems Limited, 1 Kingdom Avenue, Northacre Industrial Park, Westbury, Wiltshire BA13 4WE. In the following description and in the Figures, the sealant will be indicated with reference number 110 in the Figures.

At step 300 of the method according to the present invention, a longitudinal cut is applied to the cable sheath 101 to expose the optical core and the optical fiber(s) therein. In the following description, reference will be made, for sake of non-limiting example, to a cable comprising a single optical fiber.

In particular, in order to longitudinally cut the sheath 101 for accessing the optical fiber 103 comprised therein, firstly the two grooves 105 may be identified. Then, two longitudinal cuts may be made at diametrically opposed positions, in the portion of the sheath 101 close to a free end of the cable 1. Such cuts may be made one-by-one by means of a cutter provided with a single blade. Alternatively, the cuts may be made by means of a tool having two opposite blades which perform both cuts at a same time. The cuts may cross the sheath 101 through its entire thickness. The ripcords 108 protect the optical core 100 from damages due to accidental impacts of the blade(s) against the buffer tube 102. The cuts divide the sheath 101 into two substantially identical halves (or half-sheaths).

Figure 4:
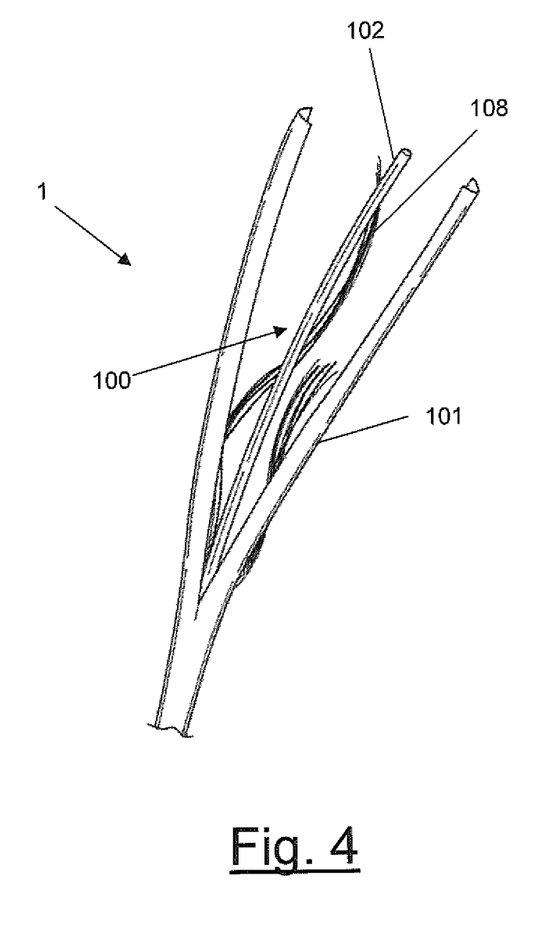
FIG. 4 illustrates the cable after removing a portion of the cable sheath in accordance with an embodiment of the present invention.

Then, the operator may grip the two half-sheaths with her/his hands and pull them apart. The pulling force causes the sheath 101 to fracture, thereby propagating the initial short cuts longitudinally along the sheath 101 through its whole thickness. The half-sheaths may be pulled until the cuts in the sheath 101 have propagated for the desired length, e.g. for a length between 200 and 250 mm. The cable sheath 201 is therefore removed from the cable 1 in a "banana peel" fashion, as shown in FIG. 4.

Figure 5:
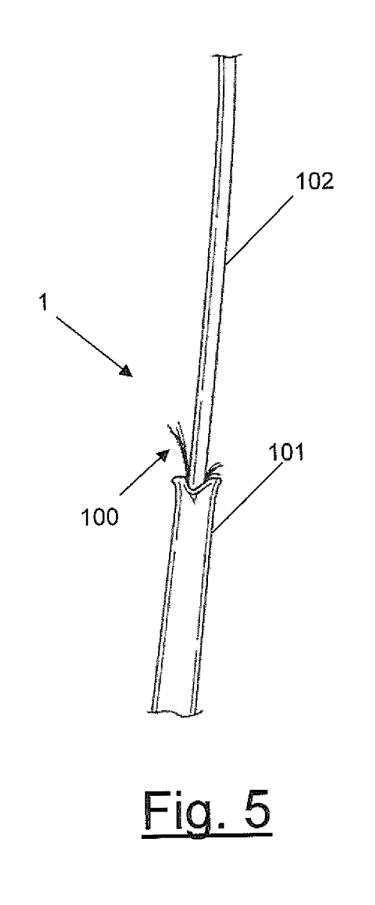
FIG. 5 illustrates the cable after cutting the removed portion of the cable sheath in accordance with an embodiment of the present invention.
Figure 6:
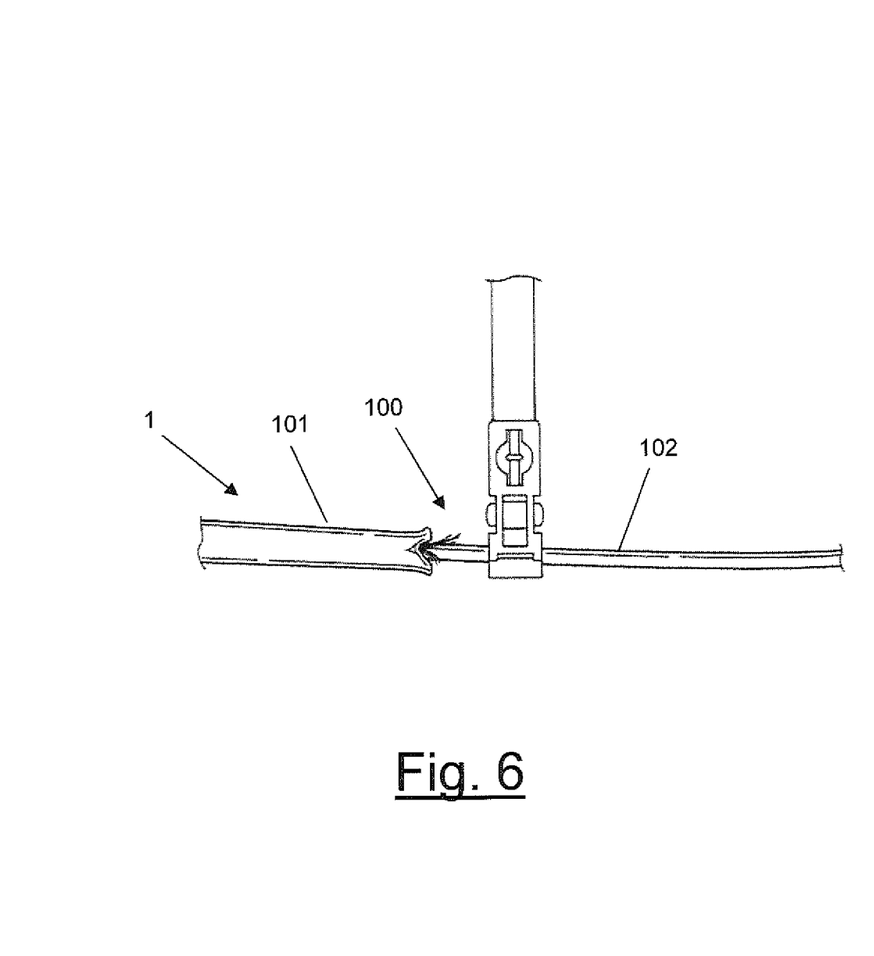
FIG. 6 illustrates the cable along with a cutter used to cut the exposed buffer tube in accordance with an embodiment of the present invention.

At step 301, the portion of the cable sheath 101 that has been cut is removed, together with the ripcords 108. A portion of optical core 100 having substantially the same length as the length of removed sheath is accordingly exposed, the exposed portion of the optical core 100 extending outward beyond a butt of the cut sheath 101, as shown in FIG. 5. At step 302, the operator may then cut the buffer tube 102 of the exposed optical core 100 with a suitable cutter. The cut may be performed at a given distance from the butt of the sheath 101, for instance at a distance comprised between 5 mm and 10 mm. FIG. 6 shows the cutter used to cut the buffer tube 102.

Figure 7:
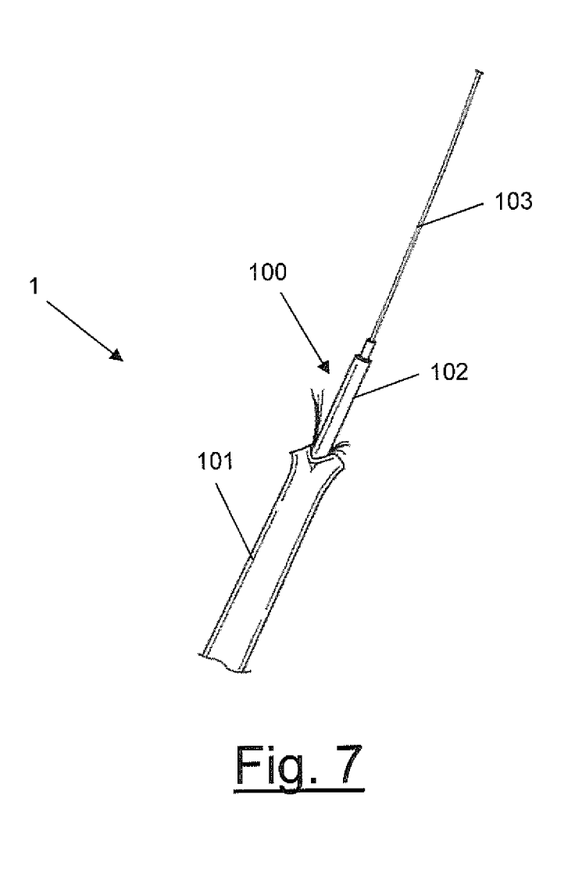
FIG. 7 illustrates the cable after removing a portion of the buffer tube to expose an optical fiber in accordance with an embodiment of the present invention.

Then, at step 303, the operator removes the buffer tube 102 from around the optical fiber 103 comprised therein, thereby exposing a portion of the optical fiber 103. In some embodiments, the operator may leave an exposed portion of the buffer tube extending outward beyond the butt of the sheath 101. FIG. 7 shows the portion of the optical fiber 103 that has been exposed after removal of the buffer tube 102, such portion being extending outward beyond the end of the exposed portion of the buffer tube 102 that is left in the cable 1. The exposed portion of the buffer tube 102 projecting from the sheath butt has a length corresponding to the distance, from the sheath butt, at which the buffer tube 102 has been cut. This length can be, for instance, comprised between 5 mm and 10 mm.

In some embodiments, at it will be clearer from the description herein below, and from the related Figures, cutting the buffer tube 102 at a certain length, e.g. few millimeters, from the sheath butt or, in other words, leaving a certain length of exposed buffer tube extending outward beyond the butt of the sheath, may provide some benefits to the reliability of the coupling method and the product resulting from said method application. Indeed, it ensures that there will be enough sealant around the exposed portion of the buffer tube to lock firmly the buffer tube with the optical fiber.

At step 304, the surface of the exposed portion of the buffer tube 102, when present, may be abraded by using, for instance, a rough emery cloth. At this point, the optical fiber 103 may also be cleaned.

Then, a length of the blocking tube 109 is cut to be slid over the exposed portion of the optical fiber 103. Such length may be comprised between 40 mm and 50 mm. For instance, the length of the blocking tube 109 may be equal to 45 mm.

Figure 8:
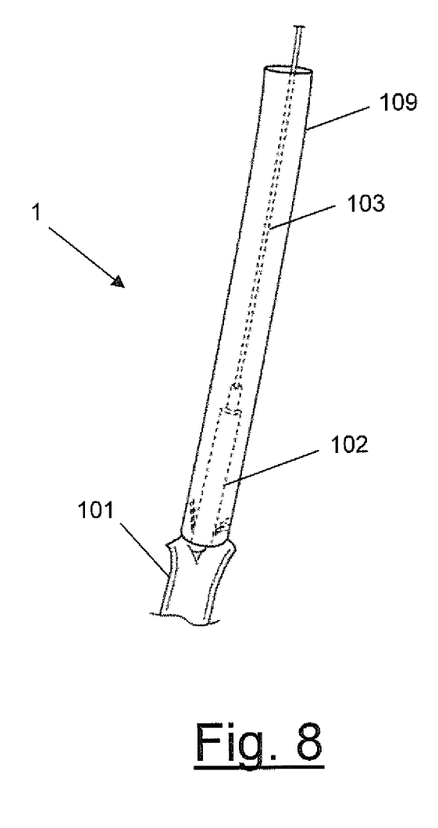
FIG. 8 illustrates the cable after resting a blocking tube on the sheath in accordance with an embodiment of the present invention.

At step 305, the blocking tube 109 is made to slide around the exposed portion of the optical fiber 103 to at least partially surround a section of the exposed optical fiber 103. In some embodiments, the blocking tube 109 is made to slide around the exposed portion of the optical fiber 103 to at least partially surround a section of the exposed optical fiber 103 extending outward beyond the exposed portion of the buffer tube 102 as well as a section of the exposed buffer tube 102 (in particular, a section of the buffer tube 102 at the opposite end with respect to the butt of the sheath). In case the blocking tube 109 has no opening in its sidewall, it almost completely surrounds a section of the exposed optical fiber 103 as well as, in some embodiments, a section of the exposed buffer tube 102. The section of the exposed the buffer tube 102 which is at least partially surrounded by the blocking tube 109 may correspond to, according to the embodiments of the present invention, 50%-100% of the entire length of the exposed portion of the buffer tube 102. In particular, the blocking tube 109 may be made to slide around the exposed the optical fiber 103 and the exposed buffer tube 102 until one end of the blocking tube 109 leans against the butt of the cable sheath 101. The blocking tube 109 may hence rest on the sheath butt as shown in FIG. 8. In the embodiment illustrated in this Figure, the blocking tube 109 covers a section of the exposed optical fiber 103 as well as almost the entire length of the exposed portion of the buffer tube 102.

Figure 9:
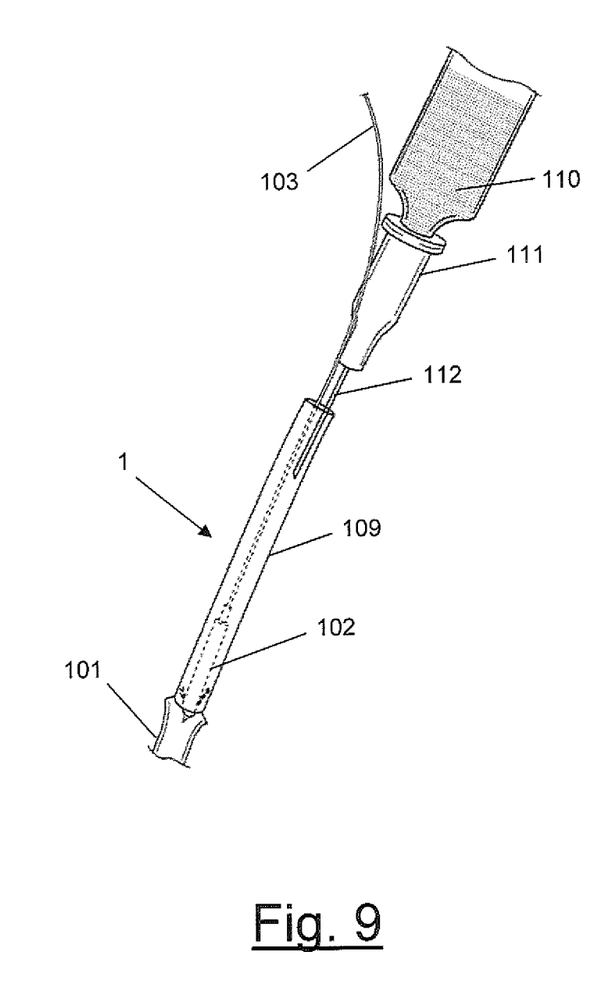
FIG. 9 illustrates the syringe and the syringe tip injecting the sealant inside the blocking tube in accordance with an embodiment of the present invention.

Then, at step 306, the sealant no is injected into the blocking tube 109. Injection may be performed by using a syringe 111 and a syringe tip 112, which may have a diameter of ranging between 1 mm and 2 mm. When performing the injection of the sealant 110, the operator ensures that there are no air pockets left in the sealant 110. The sealant 110 is hence applied around the exposed optical fiber 103 surrounded by the blocking tube 109. In some embodiments, the sealant no can be applied around the exposed optical fiber 103 and around the section of the exposed buffer tube 102, when present, surrounded by the blocking tube 109. In these last embodiments, the sealant no is applied in the interstice between the internal surface of the blocking tube 109 and the surface of such section of the exposed portion of the buffer tube 102 (which, as discloses above is abraded to improve adhesion of the sealant). In this way, at least a section of the exposed portion of the buffer tube 102 is locked with the blocking tube 109. Moreover, the sealant no is injected in the blocking tube 109 around the exposed optical fiber 103 until it fills the blocking tube 109. In this way, the optical fiber 103 is effectively locked with the blocking tube 109 and coupled to the cable. In case the blocking tube 102 has a longitudinal opening in its sidewall, the cut is filled with the sealant 110, which hence closes the blocking tube 102. FIG. 9 shows the syringe in and the syringe tip 112 injecting the sealant 110 inside the blocking tube 109. In an embodiment where the blocking tube 109 is made to slide around the exposed optical fiber 103 and the exposed buffer tube 102 until one end of the blocking tube 109 leans against the butt of the cable sheath 101, the blocking tube 109 may be at least in part glued to the cable sheath 101.

The operator may then carry out splicing, pre-connectorizing and other installation operations on the optical fiber 103.

Figure 10:
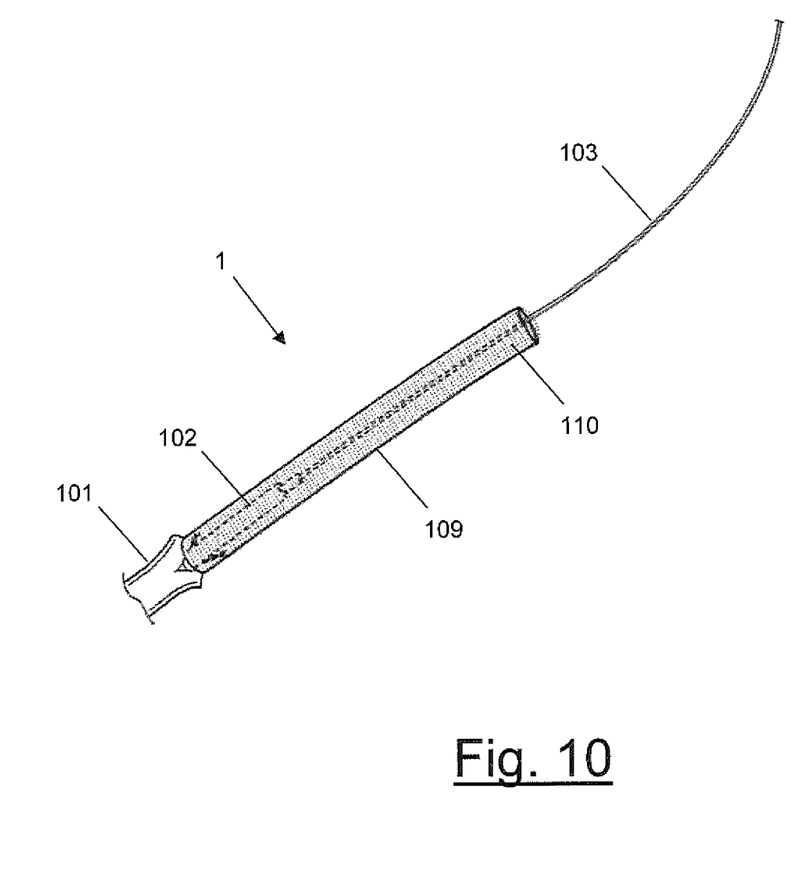
FIG. 10 illustrates the cable with the blocking tube filled with the sealant to couple the optical fiber to the cable in accordance with an embodiment of the present invention.

FIG. 10 shows the cable 1 with the blocking tube 109 filled with the sealant no to couple the optical fiber 103 to the cable. The sealant 110 is made to cure for a period of time (e.g. 1 hour) until the sealant is set.

It is to be noticed that the description above has been made with reference to an exemplary cable comprising an optical core with a single optical fiber. However, the present invention may be applied also to other types of cables, in particular to cables comprising optical cores with more than one optical fiber loosely arranged therein. In these cases, after having cut the cable sheath and the buffer tube so as to expose a length of the optical fibers, the blocking tube is made to slide over the exposed length of the optical fibers and the sealant is injected to couple the optical fibers to the cable in substantially the same manner described above. The present invention may be applied also to MLT cables. In these cables, after having cut the cable sheath and the buffer tubes, the optical fibers arranged in each loose tube can be all grouped in a single blocking tube or a respective blocking tube per each buffer tube can be employed in substantially the same manner described above.

As apparent from the description above, the present invention provides for blocking the optical fiber(s) in a fiber optic cable without using cumbersome cable anchoring devices such as a pair of bollards. The optical fiber(s) is/are coupled to the cable by using a blocking tube and a sealant, which renders this arrangement very compact with respect to state-of-the-art arrangements. As a result, the method of the present invention can be applied to prevent the excess of the optical fiber(s) from being pulled in the span in aerial cable installations comprising a bunch of fiber optic cables. Moreover, it also results in a reduction of costs since it requires using cheap materials (namely, a small length of a tube that can be made of PVC and a sealant) as compared to using cable anchoring devices such as those described above.

It is further to be noticed that the method of the present invention, in particular using a blocking tube around the exposed optical fiber, allows maximizing the adhesion between the optical fiber and the sealant and also better distributing the mechanical stress. Indeed, the surfaces of adhesion are clean and some of them relatively large. In particular, the present invention provides for exposing the optical fiber and cleaning it so that its surface is free from the gel that typically fills the buffer tube (whose presence would degrade the adhesion). In this way, the sealant very effectively locks together the optical fiber and the blocking tube, which is at least few centimeters long and hence offers a relatively large adhesion surface for the sealant, to also better distribute the mechanical stress. Moreover, according to some embodiments of the present invention, the exposed portion of the buffer tube, which also provides a relatively large adhesion surface for the sealant, can be abraded so as to clean it and further improve adhesion.

What is claimed is:

1. A method for securing an optical fiber of a fiber optic cable, the method comprising:
    cutting for a predetermined length through a sheath of the fiber optic cable to expose a portion of an optical core extending outward beyond a butt of a remaining uncut sheath, the fiber optic cable comprising the sheath surrounding the optical core that comprises a buffer tube, the optical fiber being loosely contained in the buffer tube;
    cutting a portion of the buffer tube contained in the exposed portion of the optical core and exposing a portion of the optical fiber, wherein cutting the portion of the buffer tube comprises cutting the buffer tube of the exposed portion of the optical core at a predetermined distance from the butt leaving an exposed portion of the buffer tube extending outward beyond the butt and exposing a portion of the optical fiber;
    using a blocking tube to at least partially surround a section of the exposed portion of the optical fiber, wherein using the blocking tube comprises using the blocking tube to at least partially surround a section of the exposed portion of the optical fiber and a section of the exposed portion of the buffer tube; and
    injecting a sealant into the blocking tube to lock the optical fiber within the blocking tube and couple the exposed portion of the optical fiber to the fiber optic cable.

2. The method according to claim 1, wherein using the blocking tube further comprises sliding the blocking tube over the exposed portion of the optical fiber and over the exposed portion of the buffer tube until an end of the blocking tube leans against the butt.

3. The method according to claim 1, further comprising abrading a surface of the exposed portion of the buffer tube.

4. The method according to claim 3, wherein using the blocking tube further comprises sliding the blocking tube over the exposed portion of the optical fiber and over the exposed portion of the buffer tube until an end of the blocking tube leans against the butt.

5. The method according to claim 3, further comprising cleaning the exposed portion of the optical fiber.

6. The method according to claim 1, further comprising cleaning the exposed portion of the optical fiber.

7. The method according to claim 1, wherein the blocking tube has a length ranging between 40 mm and 50 mm.

8. The method according to claim 1, wherein the blocking tube is a hollow cylinder having a cross section with an outer diameter of 4 mm and an inner diameter comprised between 2.5 mm and 3 mm.

9. The method according to claim 1, wherein the blocking tube is made of polyvinyl chloride or polyethylene.

10. The method according to claim 1, wherein the sealant is a two component polyurea compound or a two component polyurethane compound.

11. The method according to claim 1, further comprising:
    before using the blocking tube, abrading a surface of the exposed portion of the buffer tube, and cleaning the exposed portion of the optical fiber.

12. The method according to claim 1, wherein cutting for a predetermined length comprises longitudinally cutting at opposite grooves in the sheath and pulling apart the sheath to the predetermined length.

13. A method for installing a fiber optic cable, the method comprising:
    cutting for a predetermined length through a sheath of the fiber optic cable to expose a portion of an optical core extending outward beyond a butt of a remaining uncut sheath, the fiber optic cable comprising the sheath surrounding the optical core that comprises a buffer tube, an optical fiber being loosely contained in the buffer tube;
    cutting a portion of the buffer tube contained in the exposed portion of the optical core and exposing a portion of the optical fiber, wherein cutting the portion of the buffer tube comprises cutting the buffer tube of the exposed portion of the optical core at a predetermined distance from the butt leaving an exposed portion of the buffer tube extending outward beyond the butt and exposing the portion of the optical fiber;
    sliding a blocking tube to at least partially surround a section of the exposed portion of the optical fiber and a section of the exposed portion of the buffer tube; and
    injecting a sealant into the blocking tube to lock the optical fiber within the blocking tube and secure the exposed portion of the optical fiber to the fiber optic cable.

14. The method according to claim 13, further comprising:
    before sliding the blocking tube, abrading a surface of the exposed portion of the buffer tube, and cleaning the exposed portion of the optical fiber.

15. A fiber optic cable comprising:
    an optical core comprising a buffer tube and an optical fiber loosely contained in the buffer tube;
    a sheath surrounding the optical core;
    an exposed portion of the optical fiber;
    a blocking tube at least partially surrounding a section of the exposed portion of the optical fiber;
    a sealant disposed in the blocking tube and holding the optical fiber securely within the blocking tube to secure the exposed portion of the optical fiber to the fiber optic cable; and
    an exposed portion of the buffer tube extending outward beyond a butt of the sheath, wherein the exposed portion of the optical fiber extends outward beyond the end of the exposed portion of the buffer tube, wherein the blocking tube at least partially surrounds a section of the exposed portion of the optical fiber and a section of the exposed portion of the buffer tube, and wherein, along a radial direction from a center of the fiber optic cable, an end of the blocking tube overlaps with the exposed portion of the buffer tube.

16. The fiber optic cable according to claim 15, wherein an end of the blocking tube leans against the butt of the sheath.

17. The fiber optic cable according to claim 15, wherein the blocking tube has a length ranging between 40 mm and 50 mm.

18. The fiber optic cable according to claim 15, wherein the blocking tube is a hollow cylinder having a cross section with an outer diameter of 4 mm and an inner diameter comprised between 2.5 mm and 3 mm.

19. The fiber optic cable according to claim 15, wherein the blocking tube is made of polyvinyl chloride or polyethylene.

20. The fiber optic cable according to claim 15, wherein the sealant is a two component polyurea compound or a two component polyurethane compound.

* * * * *